United States Patent
Richard et al.

(10) Patent No.: US 6,963,061 B2
(45) Date of Patent: Nov. 8, 2005

(54) ORTHOGONAL COUPLED TRANSCEIVER

(75) Inventors: Fred Vincent Richard, Scottsdale, AZ (US); Paige Holm, Phoenix, AZ (US)

(73) Assignee: Motorola, Inc., Schaumburg, IL (US)

( * ) Notice: Subject to any disclaimer, the term of this patent is extended or adjusted under 35 U.S.C. 154(b) by 455 days.

(21) Appl. No.: 10/222,187

(22) Filed: Aug. 15, 2002

(65) Prior Publication Data

US 2004/0033025 A1    Feb. 19, 2004

(51) Int. Cl.[7] .............................. G01J 1/04; G01J 1/42; G01J 5/08
(52) U.S. Cl. ..................... 250/227.14; 257/82; 257/98; 257/432; 385/14; 385/15
(58) Field of Search ................. 250/227.14, 214.1, 250/559.3, 216; 257/80–84, 98, 432; 385/14–15, 385/47; 372/50, 107–108

(56) References Cited

U.S. PATENT DOCUMENTS

| | | | |
|---|---|---|---|
| 3,955,072 A * | 5/1976 | Johannsmeier et al. ...... | 318/601 |
| 4,173,001 A * | 10/1979 | Frosch et al. ................. | 372/71 |
| 5,485,021 A * | 1/1996 | Abe ............................. | 257/84 |
| 5,914,976 A * | 6/1999 | Jayaraman et al. ........... | 372/50 |
| 5,963,684 A * | 10/1999 | Ford et al. ..................... | 385/24 |
| 6,456,766 B1 * | 9/2002 | Shaw et al. ................... | 385/47 |
| 6,597,713 B2 * | 7/2003 | Ouchi .......................... | 372/36 |
| 6,765,948 B2 * | 7/2004 | Murry et al. ................ | 372/107 |

\* cited by examiner

*Primary Examiner*—David Porta
*Assistant Examiner*—Suezu Ellis

(57) ABSTRACT

The transceivers of the present invention use orthogonal coupling, i.e., perpendicular to the substrate, for a single fiber implementation of a transceiver incorporating both a VCSEL and a detector. The methods of the present invention include aligning and bonding a substrate wafer to a coupling wafer, prior to dicing the resultant compound wafer.

11 Claims, 3 Drawing Sheets

ORTHOGONAL COUPLED TRANSCEIVER

TECHNICAL FIELD

The present invention relates generally to the field of fiber optic communications and more specifically relates to manufacturing methods and techniques for fabricating fiber optic transceivers.

BACKGROUND OF THE INVENTION

The increasing demand for high-speed data communications and broadband access to computer networks such as the Internet is creating a corresponding demand for additional network bandwidth. In many cases, increasing the available bandwidth involves deploying fiber optic networks to replace older, slower transmission media. Additionally, current efforts by many businesses, government agencies, educational institutions, municipalities and the like involve creating and/or expanding existing fiber optic networks to reach additional end-users.

Extending the fiber optic transmission line beyond the backbone and to the final point of end-user access generally requires a relatively significant increase in the number of optical terminations or optical transceivers on the network. These transceivers may be termed "Fiber To The X" transceivers or "FTTX" transceivers where the "X" represents a final termination point for one part of the fiber optic network. One type of FTTX transceiver, a single fiber implementation, comprises a 1.3 micron laser light source and a 1.55 micron detector/amplifier. These single fiber FTTX transceivers use the same fiber to receive and detect 1.55 micron light signals and generate 1.3 micron light signals in return. It should be noted that other types of FTTX transceivers are in use, many of which use one fiber to receive signals and another fiber to send signals.

Manufacturing these FTTX transceivers typically involves fabricating a coupling structure that simultaneously couples the 1.3 micron laser to the fiber and re-directs the in-coming 1.55 micron light to the detector/amplifier. Many FTTX transceivers are implemented using planar technologies including waveguide structures that separate the incoming 1.55 micron light signal from the outgoing 1.3 micron light signal so that optical crosstalk between the 1.55 micron detector/amplifier and 1.3 micron laser is kept as low as possible. Other implementations include edge-emitting waveguide coupled lasers, waveguide-coupled detectors, and spot size converters that convert the fiber modes into relatively compact semiconductor waveguide modes and back again.

Several different technologies have been employed to manufacture these various FTTX transceivers. First, some transceivers have been built using the component and packaging technology previously developed in conjunction with the telecommunications industry. This approach consists of assembling the packaged, discrete optical, opto-electronic, and electronic components into modules and interconnecting the various discrete components with miniature optical components mated to the output fiber. The advantage of this approach is that the technology utilized is well established and proven, thereby ensuring reliable products that perform in a well-understood fashion. The disadvantage of this approach is the high cost of assembly due to the very precise alignment needed between the optical components and fiber.

A second approach involves the use of hybrid integration technologies such as silicon optical bench (SiOB) and planar light circuits (PLCs). In this approach, the various components are mounted in die form directly onto a silicon carrier that contains both the optical and electrical interconnections among the components. The optical functions that may be integrated onto the silicon carrier include fiber alignment trenches, passive waveguides, splitter/combiners wavelength division multiplexers, reflectors, lenses, etc. Precision pick and place at the silicon carrier wafer level can be used to assemble these units in large volumes. A substantial reduction in both size and cost of a transceiver can be realized with this approach. Additionally, it offers a significant amount of flexibility in the design and type of functionality that can be incorporated onto the silicon substrate.

While commonly used, each of these various FTTX transceiver fabrication processes present various cost and performance consideration in certain applications. For example, active fiber to waveguide alignment and packaging, which is used in many transceiver packaging approaches, is a relatively expensive and time consuming process. Additionally, losses in the typical fiber-to-waveguide coupling can be in the range of 1.0 to 1.5 dB for a typical fiber semiconductor waveguide coupling, assuming the use of a common spot size converter (SSC). Yet another consideration is the overall fabrication cost associated with the typical epi regrowth processes that may be needed to create the desired structures of the integrated transceiver.

Another consideration, particularly with the planar approaches, is the continued problems associated with optical crosstalk, generated by the various components that comprise the FTTX transceiver. Depending on the specific device, the level of crosstalk between the 1.3 micron source and the 1.55 micron receiver of the transceiver can be the limiting factor in certain applications. Finally, the special manufacturing steps and costs associated with the assembly and alignment of discrete components can be quite costly and undesirable in many high volume production situations.

In view of the foregoing, it should be appreciated that there is still a need for an efficient, cost effective method and apparatus for providing FTTX transceivers in fiber optic communication networks. The present invention provides such a transceiver while minimizing the undesired effects of crosstalk between components.

In addition, the present invention addresses other FTTX transceiver deficiencies that are not expressly or inferentially addressed in this background of the invention or the following detailed description of the drawings. Furthermore, additional desirable features provided by the present invention will become apparent to one of ordinary skill in the art from this background of the invention, drawings, detailed description of the drawings, claims and abstract.

SUMMARY OF THE INVENTION

A compound wafer structure includes a substrate wafer bonded to a coupling wafer. The substrate wafer has a plurality of light sources, a plurality of detector structures, and at least one alignment structure. The coupling wafer includes a plurality of reflector structures and at least one alignment structure formed in said coupling wafer.

BRIEF DESCRIPTION OF THE DRAWINGS

The following detailed description of the drawings is merely exemplary in nature and is not intended to limit the invention or the application and uses of the invention. Furthermore, there is no intention to be bound by any theory presented herein.

The present invention will hereinafter be described in conjunction with the appended drawing figures, wherein like numerals denote like elements, and.

DETAILED DESCRIPTION OF THE DRAWINGS

The following detailed description of the preferred embodiments is merely exemplary in nature and is not intended to limit the invention or the application and uses of the invention. Furthermore, there is no intention to be bound by any theory presented in the preceding background of the invention or the following detailed description of the preferred exemplary embodiments.

The approach of the present invention is based on orthogonal coupling, i.e., perpendicular to the substrate, for a single fiber implementation of a transceiver incorporating both a 1.3 micron wavelength VCSEL and a 1.55 micron wavelength detector. Although presented as orthogonally coupled, it should be noted that other angles of incidence may be implemented by changing the angles described in conjunction with the reflector structures. Additionally, although the transceivers of the present invention are described in the context of 1.3 micron and 1.55 micron wavelengths for convenience of illustration, it should be understood that the methods and structures described herein can be readily adapted and optimized for use with other wavelengths based on the specific application requirements.

Specifically, the 1.3 micron wavelength VCSEL described herein falls generally in the O-band spectrum (1.26 microns to 1.36 microns) and the 1.55 micron wavelength detector described herein falls generally in the C-band spectrum (1.53 microns to 1.6 microns). While not specifically mentioned, VCSELs and detectors for other wavelengths are specifically included in the apparatus and methods of the present invention. For example, the preferred embodiments of the present invention may be readily adapted to correspond to other wavelengths by adjusting the materials used for coatings, etc.

Figure 1:
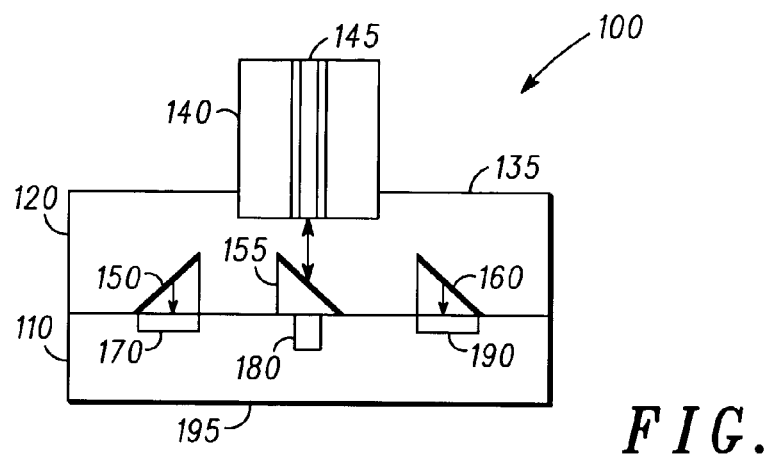
FIG. 1 is a cross-sectional view of a VCSEL transceiver in accordance with a preferred exemplary embodiment of the present invention.

Referring now to FIG. 1, an orthogonal coupled transceiver 100 according to a preferred exemplary embodiment of the present invention is depicted. Transceiver 100 comprises a substrate 110, a coupling layer 120, and an optical fiber 145 housed in a fiber ferrule 140. Coupling layer 120 provides both a physical connection point for optical fiber 145 as well as a medium for transmitting the signals traveling over optical fiber 145 to a receiver/detector 190 and from a VCSEL 180 to optical fiber 145. Additionally, an optional monitor/detector 170 may be provided in substrate 110.

Optical fiber 145, along with ferrule 140, is inserted into a cylindrical depression that is molded into the top surface 135 of coupling layer 120. The fiber optic cable associated with optical fiber 145 and ferrule 140 may be any typical fiber optic cable assembly suitable for use in standard computer and telecommunications data communication. In the present example, optical fiber 145 is capable of transmitting both 1.55 micron light signals and 1.3 micron light signals. To prevent disengagement of fiber optic cable 145 and ferrule 140, ferrule 140 may be secured in place by applying a suitable index matching epoxy in the cylindrical depression.

Substrate 110 may be fabricated from any suitable material known to those skilled in the art but is most preferably fabricated using either a gallium arsenide (GaAs) or indium phosphide (InP) based material. Substrate 110 most preferably comprises a 1.55 micron receiver/detector 190, a 1.3 micron VCSEL 180, and an optional 1.3 micron monitor/detector 170. Substrate 110 has a lower surface 195 that is capable of receiving backside connections (not shown this FIG.) for monitor/detector 170, VCSEL 180, and receiver/detector 190. These backside connections may be advantageously used to connect transceiver 100 to other circuits and devices. Additional details regarding monitor/detector 170, VCSEL 180, and receiver/detector 190 are presented in conjunction with FIGS. 7 and 8.

Coupling layer 120 is fabricated by a molding process and has a series of 45° depressions formed therein. As previously mentioned, coupling layer 120 has a cylindrical depression molded into top surface 135 that is sized and positioned to accept optical fiber 145 and fiber ferrule 140. After molding, the lower surface of coupling layer 120 is coated with a plurality of coatings to create multi-layer dielectric mirror stacks 155 and 160.

Additionally, if optional monitor/detector 170 is used, then multi-layer dielectric mirror stack 150 will also be present as shown. Multi-layer dielectric mirror stacks 155 and 160 exhibit relatively high reflectivity at 1.55 $\mu$m (most preferably in the range of approximately 99.7%–99.9%) and relatively high transmissivity at 1.3 $\mu$m (most preferably approximately >97%). The mirror-like surfaces of multi-layer dielectric mirror stacks 155 and 160 cause the incoming 1.55 $\mu$m signal from fiber optic cable 145 to be reflected from multi-layer dielectric mirror stack 155 to multi-layer dielectric mirror stack 160 and then to receiver/detector 190. The molding process for fabricating coupling layer 120 is further described in conjunction with FIG. 4.

Further, if used, optional monitor/detector 170 and multi-layer dielectric mirror stack 150 may be located as indicated. Multi-layer dielectric mirror stack 150 will be coated to exhibit relatively high reflectivity at 1.3 $\mu$m and multi-layer dielectric mirror stack 155 will exhibit some reflectivity at 1.3 $\mu$m, thereby allowing a small portion of the 1.3 $\mu$m signal emitted by VCSEL 180 to be reflected from multi-layer dielectric mirror stack 155 to multi-layer dielectric mirror stack 150 and then to monitor/detector 170.

One additional advantage of using the multi-layer mirror arrangement shown for transceiver 100 in FIG. 1 for both 1.3

µm and 1.55 µm wavelengths is that any light signal that is not substantially reflected by multi-layer dielectric mirror stacks 150, 155, and 160 are transmitted laterally, i.e. parallel to substrate 110, or vertically away from substrate 110. Any residual 1.55 µm signal that enters substrate 110 will generally not be energetic enough to interact with the 1.3 µm bandgap of VCSEL 180.

In addition to the various components of transceiver 100 shown in FIG. 1, it may be desirable to fabricate a transimpedance amplifier for receiver/detector 190 and a laser driver for VCSEL 180 on the same chip. Additional detailed descriptions of the various components of transceiver 100 are presented in conjunction with FIGS. 2–8.

Figure 2:
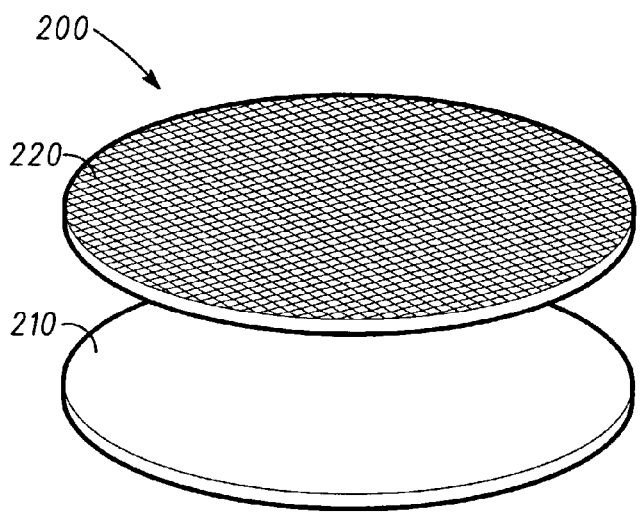
FIG. 2 is a perspective view of wafer assembly process for fabricating a plurality of VCSEL transceivers in accordance with a preferred exemplary embodiment of the present invention.

Referring now to FIG. 2, a wafer assembly process step 200 for simultaneously manufacturing a plurality of transceivers in accordance with a preferred exemplary embodiment of the present invention is depicted. As shown in FIG. 2, a substrate wafer 210 and a coupling wafer 220 are joined together to form the first and second layers for a plurality of transceivers. Substrate wafer 210 corresponds to substrate layer 110 of FIG. 1 and coupling wafer 220 corresponds to coupling layer 120 of FIG. 1.

Coupling wafer 220 may be fabricated from any suitable material. In the most preferred embodiments of the present invention, coupling wafer will be fabricated from glass. Any suitable glass may be used, including moldable glasses such as Schott BK7, FK-5 and Minolta PKS-1. In addition to being moldable, it is desirable to select a glass with a thermal expansion coefficient that closely matches the thermal expansion coefficient of substrate wafer 210. While glass will typically be selected for most general applications, plastic may also be used in relatively benign temperature environments.

Prior to bonding, the dielectric mirror coatings that create the multi-layer dielectric mirror stacks depicted in FIG. 1 are applied to the 45° surfaces of the ridges formed in the bottom surface of coupling wafer 220. These coatings may be advantageously applied simultaneously to a plurality of wafers for both the 1.3 µm and 1.55 µm coatings so that the cost of the coatings can be greatly reduced when considered on a cost/per transceiver basis. After the wafers have been fabricated, they can be individually tested prior to bonding.

Wafers 210 and 220 are bonded together with index matching epoxy so that minimal or preferably no air spaces are left in the 45° mirror depressions. The index matching epoxy is used so that the air cavities introduced by the 45° depressions are substantially and preferably completely filled with the epoxy so that, when assembled, the multilayer dielectric stacks are effectively suspended in a uniform, constant index medium. This process will significantly reduce or substantially eliminate undesirable Fresnel reflections.

Once wafers 210 and 220 have been fabricated, they are most preferably performance tested at the wafer level, prior to bonding. For example, the optical components of coupling wafer 220 may be tested using an input test fiber on one face and a test transceiver on the opposite face. By testing the individual wafers prior to affixing a wafer-based transceiver array, further testing at the assembled component level may be further reduced or preferably eliminated. This step can also reduce the overall transceiver fabrication costs by obviating the relatively expensive and time-consuming process of cleaving and edge coupling a typical individual "planar" transceiver.

In the most preferred embodiments of the present invention, alignment structures such as vernier type structures are molded into or patterned onto the bottom of coupling wafer 220 and corresponding alignment structures are fabricated in the top of substrate wafer 210. By utilizing the alignment structures of the present invention, the discrete components for the transceivers located in coupler wafer 220 and substrate wafer 210 are placed in alignment with each other prior to dicing the compound wafer structure. Accordingly, after bonding and simultaneously dicing coupler wafer 220 and substrate wafer 210, minimal or no further alignment of the discrete components for the individual transceivers is required.

After alignment, coupler wafer 220 can be bonded to substrate wafer 210 using any appropriate bonding technique. In the most preferred embodiments of the present invention, a standard mask aligner and index matching, UV curing epoxy is used to bond coupler wafer 220 to substrate wafer 210. Once wafers 210 and 220 have been fabricated, coated and bonded, individual transceivers may be further tested at the composite wafer level.

Before joining wafers 210 and 220, a broadband anti-reflective coating may be applied to the top surface of the compound semiconductor chip. This coating will serve to further reduce the Fresnel reflections at the interface between substrate wafer 210 and coupling wafer 220. This coating is preferably formulated to reduce reflections for both 1.3 µm and 1.55 µm signals and also serves to improve the efficiency of the VCSEL emission and detector sensitivity.

Once wafers 210 and 220 have been coated and bonded as described above, the resulting compound wafer can be processed by conventional dicing methods to produce individual transceivers. These individual transceivers can then be attached to other devices and circuits, depending on the intended use of the transceivers. It should be noted that this step is basically an assembly step since various desired alignment processes have been previously accomplished via the molding and wafer bonding steps previously described. Accordingly, and in contrast to the costly and time consuming conventional active alignment fiber pigtailed packaging techniques, the current approach advantageously uses the fact that the electrical connections for the VCSEL and detector are all transferred to the back of the substrate through use of via technology.

It should be noted that the use of alignment structures in individual wafers to simultaneously align multiple discrete structures contained within a first wafer with multiple discrete structures contained within a second structure is not limited in application to the transceivers as described herein. Rather, it is anticipated that other uses of the alignment structures described herein will find application for simultaneously aligning other devices, whether active or passive, whether on two wafers or more than two wafers. The alignment methods described herein can be expanded to include simultaneously aligning multiple devices on multiple wafers.

Since the individual transceivers are formed by dicing up the compound wafer structure, the outer edges of the various layers may be relatively rough. It may be desirable to apply a very low viscosity epoxy to these rough surfaces to fill voids and "planarize" them. An absorbing layer, one that strongly absorbs 1.3 µm and 1.55 µm light waves, could then be placed on the exterior surfaces of the coupler layer to eliminate or strongly minimize any scattered light. This optional step will help to further minimize undesirable crosstalk.

Figure 3:
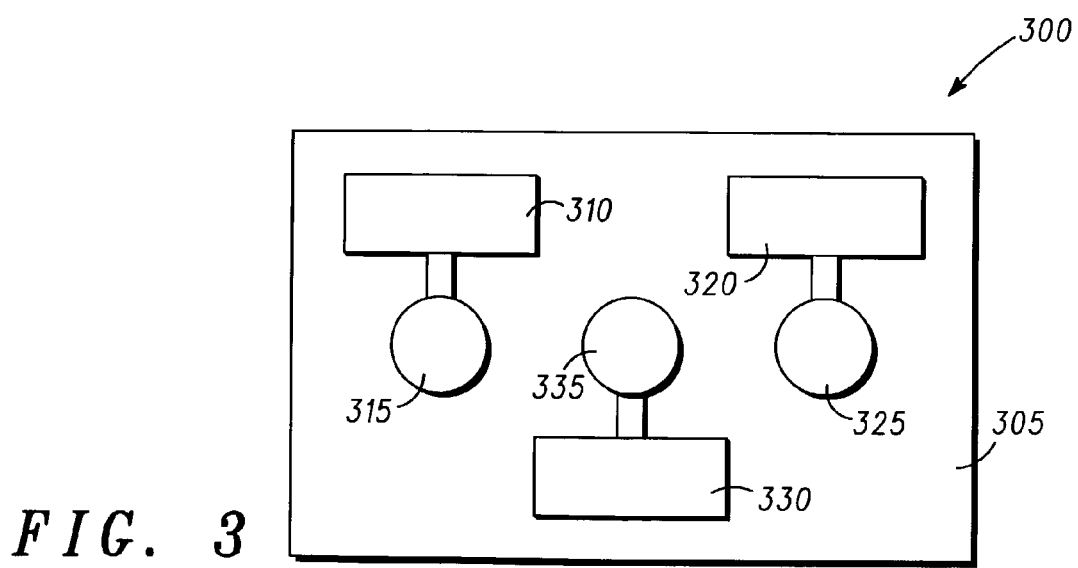
FIG. 3 is a block diagram depicting a VCSEL transceiver in accordance with an alternative preferred exemplary embodiment of the present invention.

Referring now to FIG. 3, a block diagram for a transceiver 300 according to an alternative preferred exemplary embodiment of the present invention comprises: a substrate 305; an amplifier 310 coupled to a 1.3 μm monitor/detector 315; a 1.3 μm VCSEL 335 coupled to a laser driver 330; and a trans-impedance amplifier 320 coupled to 1.5 μm receiver/detector 325. It should be noted that electronic components amplifier 310, laser driver 330, and trans-impedance amplifier 320 are optional components and are merely illustrative of the type of additional components that may be used in conjunction with the present invention. Those skilled in the art will recognize that these and other components may also be included, depending on the specific application for transceiver 300.

Figure 4:
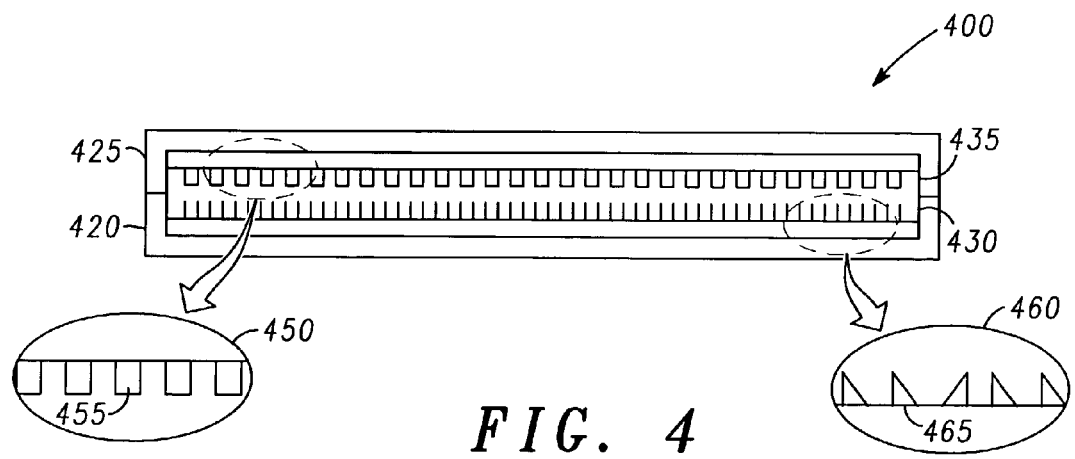
FIG. 4 is a side view of a mold assembly and insert for creating a coupling layer for a VCSEL transceiver in accordance with a preferred exemplary embodiment of the present invention.

Referring now to FIG. 4, a mold 400 suitable for use in fabricating a coupling layer in accordance with a preferred exemplary embodiment of the present invention is illustrated. As shown in FIG. 4, mold 400 comprises a lower mold portion 420 and an upper mold portion 425. Lower mold portion 420 includes a lower mold insert 430 and upper mold portion 425 includes an upper mold insert 435. Enlarged sections 450 and 460 show details related to surface of lower mold insert 430 and upper mold insert 435.

The process of fabricating lower mold portion 420 and upper mold portion 425 should be monitored since much of the alignment of the coupling optics to the active devices and the fiber optic cable depends on the precision and accuracy of the mold used to create the resulting coupling layer. In addition, in order to achieve the desired results of quick and easy final assembly of the composite wafer, alignment of the two wafers should also be accomplished with as much precision and accuracy as reasonably possible. Accordingly, in the most preferred embodiments of the present invention, lower mold portion 420 will include a series of alignment structures that will allow the finished coupling layer to be reliably mated with counterpart alignment structures found in the upper portion of the substrate wafer.

Figure 5:
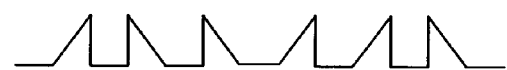
FIG. 5 is a detail view of grating cross-section for a creating a mold insert in accordance with a preferred exemplary embodiment of the present invention.

The approximately 45° surfaces used to form the basic structure for the dielectric mirrors shown in FIG. 1 may be fabricated by utilizing a large cross section 'grating' structure such as the one shown in FIG. 5. Such a structure, if fabricated with sufficient smoothness on the 45° faces, may be used directly as a mold insert for creating the structures. There are companies, such as Hyperfine, Inc. of Boulder Colorado, that have the capability of making large scale (several inches in diameter) linear ruled gratings with cross sections similar to that shown in FIG. 5. These gratings can be fabricated directly into Ni substrates of the kind commonly used as mold inserts. As previously explained, for certain applications, it may be desirable to present another angle of incidence for the fiber signal relative to the substrate. In those instances, the angle of the reflective surfaces of the dielectric mirrors may be other than 45°.

Upper mold insert 435 may be fabricated using the following steps. First, using a silica plate, an array of cylindrical holes is fabricated into the silica plate using standard photolithography techniques and a deep silica etch process. Next, the resulting silica plate is coated with a release layer and a thick layer of Ni is formed on the surface using any suitable electroplating process. Finally, the Ni surface is attached to a mold insert substrate for strength and the silica substrate is removed, leaving an array of cylindrical projections 455 in the Ni substrate. The spacing of the cylindrical projections 455 formed in upper mold insert 435 is a function of the ultimate size of the coupling optics. Cylindrical projections 455 will be sized to receive a ferrule that surrounds the optical fiber. By carefully aligning the location of cylindrical projections 455 with the underlying transceiver components 465, the fiber cable placed into each aperture formed by cylindrical projections 455 will be properly aligned with the underlying transceiver. This further reduces the relatively costly and time-consuming process of aligning the components by hand.

One issue for consideration in the fabrication process for the compound wafer assembly is the tendency for molded materials to shrink slightly as they cool. If unplanned for, shrinkage may inadvertently lead to misalignment between the coupling wafer and the substrate wafer near their edges. One approach to resolving this issue is to measure the shrinkage associated with the materials used in the fabrication process and to then establish a molding procedure that maintains the repeatability of the coupler array fabrication. Since the transceiver array spacing is typically controlled by the masks used to fabricate the transceiver array wafer, any material shrinkage associated with the coupler array can be compensated for by appropriately modifying the masks for the transceiver array wafer.

Figure 6:
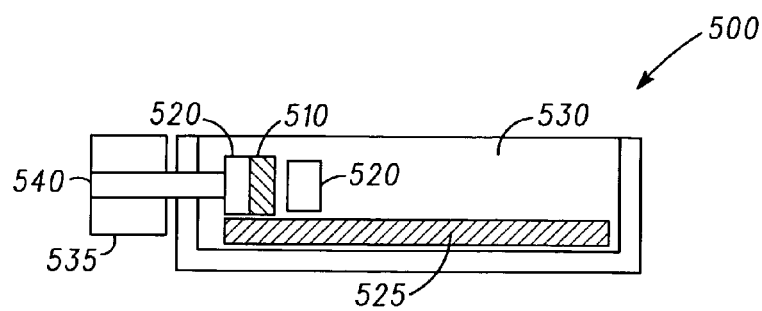
FIG. 6 is a side view of an assembly and connection technique for a VCSEL transceiver in accordance with a preferred exemplary embodiment of the present invention.

Referring now to FIG. 6, a side view of a mounting technique for transceiver 300 of FIG. 3 is depicted. This mounting technique is similar to the typical "no-alignment" or "flip-chip" attachment technique well known to those skilled in the art. Once the bonded wafers have been diced up to form individual transceivers, the rest of the transceiver assembly process involves fairly conventional techniques that are well known to those skilled in the art. After the fiber/ferrule combination 540 is attached to transceiver die with layers 520 and 510, a high temperature ball bonding step is used to attach an interconnect block 520 to the back side of semiconductor die 510.

Interconnect block 520 has internal interconnect paths that connect bond pads used in the first ball bonding step to bond pads on the bottom of interconnect block 520. The fiber/ferrule/transceiver/interconnect assembly is then inserted into a fiber connector 535 that has been mated with an electronic package 530. Once inserted and aligned with the main transceiver chip 525, a final lower temperature ball bonding step is performed to attach interconnect block 520 to the electronic transceiver chip 525. It should be noted that this specific example is only illustrative of one possible connection technique. Many other connection and attachment methods known to those skilled in the art may be used in conjunction with the transceivers of the present invention as well.

Figure 7:
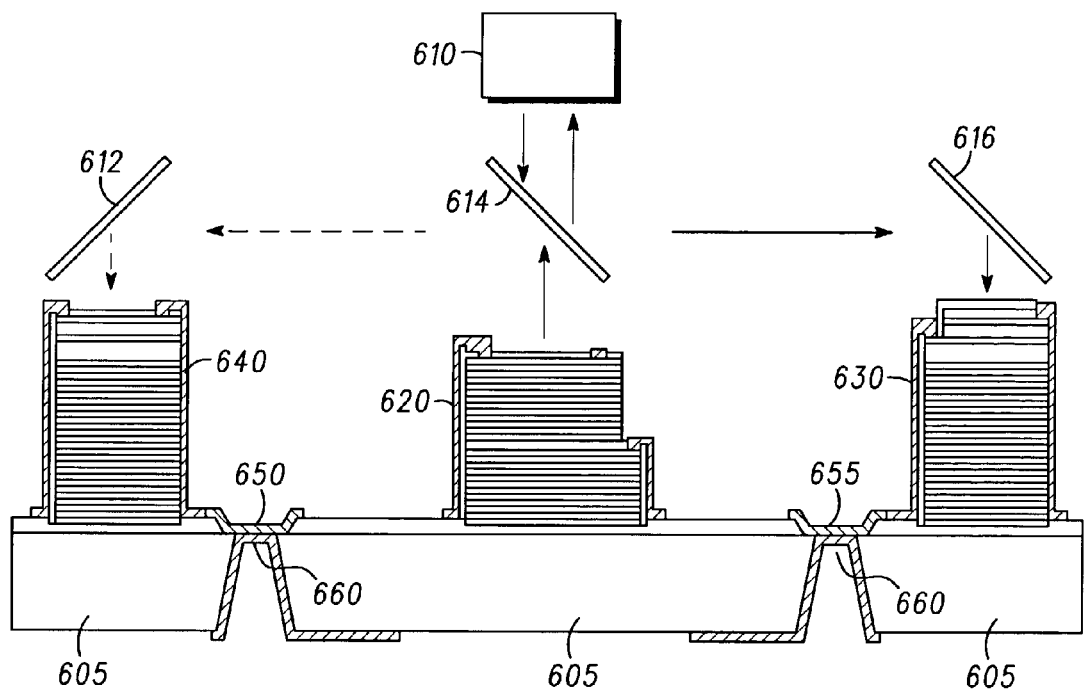
FIG. 7 is a cross-sectional view of the VCSEL and detector stacks of a VCSEL transceiver in accordance with a preferred exemplary embodiment of the present invention.

Referring now to FIG. 7, the co-integration of a 1.3 μm VCSEL 620, a 1.3 μm detector/monitor 640, and a 1.5 μm photodiode 630 on a substrate 605 according to a preferred exemplary embodiment of the present invention is depicted. For reference purposes, VCSEL 620 is analogous to VCSEL 180 of FIG. 1, detector/monitor 640 is analogous to monitor/detector 170 of FIG. 1, and photodiode 630 is analogous to receiver/detector 190 of FIG. 1. Mirror structure 612 is analogous to multi-layer dielectric mirror stack 150 of FIG. 1, mirror structure 614 is analogous to multi-layer dielectric mirror stack 155 of FIG. 1, and mirror structure 616 is analogous to multi-layer dielectric mirror stack 160 of FIG. 1.

In the most preferred embodiments of the present invention, the required epitaxial material is grown in a single step, most preferably using Molecular Beam Epitaxy (MBE). Accordingly, using the methods of the present invention, re-growth or selective epitaxial growth may be reduced. This makes the methods of the present invention less time consuming and less expensive when compared with other techniques. The structure for VCSEL 620 is preferably grown first. VCSEL 620 consists of top and bottom distributed Bragg reflectors (DBRs) used as mirrors that are located on either side of an indium gallium arsenide nitride-based (InGaAsN) active layer or other similar material. An InP-based, metamorphic detector structure is then grown directly on top of VCSEL 620 to complete the epitaxial growth.

As shown in FIG. 7, two separate detectors/monitors are fabricated within this material. Detector/monitor 640 is optimized for 1.3 μm wavelengths, and photodiode 630 is optimized for detecting 1.5 μm wavelengths and is also used for downstream signal reception. Since the material used to form photodiode 630 also responds to 1.3 μm wavelengths, the same structure may be used to form a photodiode to monitor the output of VCSEL 620. To gain access to the VCSEL layers for fabricating detector/monitor 640, all of the detector material and metamorphic buffer layers are etched away over these regions.

Downstream optical signals emitted by fiber core 610 are directed to photodiode 630 using beam-deflecting and filtering mirror structures 614 and 615. The 1.3 μm light signal emitted by VCSEL 620 is directly coupled into fiber core 610 through mirror structure 614 and a small fraction of the emitted signal is tapped off at the surface and redirected by mirror structure 612 to detector/monitor 640. Using the orthogonal coupled approach of the present invention, it should be noted that the signal fiber and, correspondingly, both the incident and launched optical beams are normal to the surface of substrate 605 instead of being parallel to the planar surface of substrate 605.

In order to make electrical connections to integrate the components shown in FIG. 7 to other devices, backside vias 660 and 665 are created. The process used to create vias 660 and 665 are well known to those skilled in the art and are similar to the techniques used in GaAs power RF devices such as Metal Semiconductor Field Effect Transistors (MESFETS) and Pseudo-Morphic High Electron Mobility Transistors (pHEMTs). The backside of substrate 605 is ground to a thickness of approximately 4 mils and then wet etched to a thickness of approximately 3 mils. This thinned surface is then patterned and via holes are etched through the remainder of substrate 605 to catch pads 650 and 655, which are formed on the upper surface of substrate 605.

Figure 8:
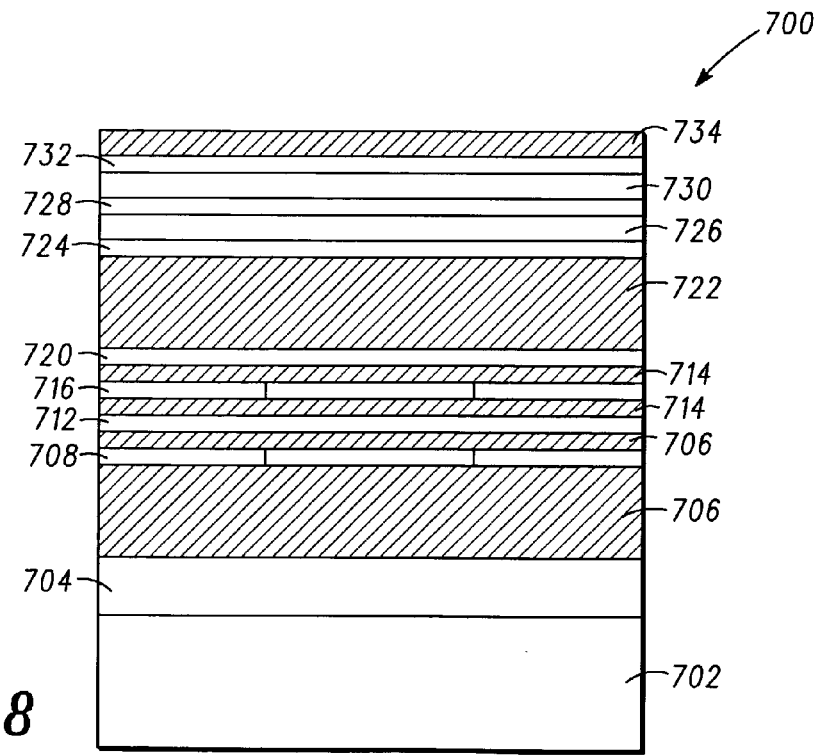
FIG. 8 is a cross-sectional view of the layers of a VCSEL stack of a VCSEL transceiver in accordance with a preferred exemplary embodiment of the present invention.

Referring now to FIG. 8, a multi-layer stack 700 in accordance with a preferred embodiment of the present invention is depicted. The vertical combination of detector and VCSEL epitaxial structures necessary to create the semiconductor devices shown in FIG. 7 may be realized in a number of different ways.

FIG. 8 illustrates an InP-based metamorphic long wavelength detector grown on top of an indium gallium arsenide nitride-gallium arsenide (InGaAsN-GaAs) 1.3 μm VCSEL in a single growth process. FIG. 8 illustrates the overall process used to fabricate the semiconductor devices shown in FIG. 7. It should be noted that not all of the layers shown in multi-layer stack 700 are needed for the 1.3 μm VCSEL and some of the layers will be removed in certain areas after epitaxial growth is completed.

Multi-layer structure 700 may consist of a semi-insulating GaAs substrate 702, a GaAs buffer layer 704, followed by an N-type distributed Bragg reflector (DBR), 706. The active region or layer 712 may consist of single or multiple quantum well (QW) layers, typically fabricated from an indium gallium arsenide nitride (InGaAsN) material sandwiched within GaAs spacer/cladding layers. Above active layer 712 is a small section of P-type DBR 714 that provides the pn junction for current injection at active layer 712. A p++n+ GaAs tunnel junction 720 may then be inserted and the remainder of the top DBR mirror 722 can be grown as N-type along with a highly doped n-type contact layer 724. This conversion from p-type to n-type conductivity for the majority of the top DBR can greatly reduce the free carrier optical absorption typically experienced with heavily doped p+ material at the target wavelengths.

The top and bottom DBR structures typically consist of quarter wavelength optical thickness, alternating layers of GaAs and high aluminum (Al) mole fraction (>90% Al) aluminum gallium arsenide (AlGaAs). Optionally, very high Al mole fraction (~98% Al) AlGaAs layers, of appropriate quarterwave thickness, may also be incorporated into the top and/or the bottom DBRs, shown as layer 708, which is embedded within layer 706, and layer 716, which is embedded within layer 714, respectively in FIG. 8. These layers may then be laterally oxidized in from the etched mesa perimeter during the fabrication process to provide enhanced current confinement through the remaining central, unoxidized aperture region of layers 708 and 716, as shown in FIG. 8. This type of lateral oxidation technique is well known to those skilled in the art.

A metamorphic buffer layer 726 is then grown over n+ contact layer 724. Metamorphic buffer layer 726 effectively converts the lattice constant from that of GaAs to that of InP for subsequent growth of the InP-matched detector material. The detector layers may consist of an n+ indium aluminum arsenide (InAlAs) layer 728, a thick, undoped, indium gallium arsenide (InGaAs) absorption layer 730, and a p+ InGaAs contact layer 732.

During the fabrication process, the various detector layers are etched away over the location of the VCSEL device, thereby exposing the VCSEL. A single mesa etch step may then be used to define the VCSEL and detectors. One or more multi-layered optical filters 734 may optionally be applied to each of the individual detector devices to optimize their performance for the target wavelength.

Since the reduction of crosstalk is a highly desirable goal for transceiver design, at least four different crosstalk reduction means can be incorporated into a transceiver according to various preferred embodiments of the present invention. First, the VCSEL can be designed with a relatively high reflectivity backside DBR mirror to limit the amount of light emitted downward into the substrate. Second, the backside of the layer containing the VCSEL can be treated with anti-reflection coatings to extract this emission from the substrate. Third, since the detector layers rest on top of the VCSEL epitaxial growth, the DBRs of the VCSEL structure act as an optical isolator, particularly for any light emissions that are off-normal incidence. Finally, the substrate vias used to externally connect the VCSEL and the detector can be optimally positioned between the emitter and detector structures so as to shield the detector. In effect, the detector can be positioned in the "shadow" of the backside contact via in order to minimize coupling. Any combination of these crosstalk reduction means may be advantageously employed in various applications to signal to reduce, if not eliminate, undesirable crosstalk.

While the preferred exemplary embodiments have been presented in the foregoing detailed description, it should be appreciated that a vast number of variations exist. It should also be appreciated that these preferred embodiments are only examples and is not intended to limit the scope, applicability, or configuration of the invention in any way. Rather, the foregoing detailed description provides those skilled in the art with a convenient roadmap for implementing the preferred exemplary embodiments of the invention. It should be understood that various changes may be made in the function and arrangement of elements described in the exemplary preferred embodiments without departing from the spirit and scope of the invention as set forth in the appended claims.

What is claimed is:

1. A compound wafer structure comprising:
   a substrate wafer, said substrate wafer comprising:
   a plurality of light sources; and
   a plurality of detector structures; and
   a coupling wafer bonded to said substrate wafer, said coupling wafer comprising;
   a plurality of reflector structures;
   a plurality of apertures formed in said coupling wafer; and
   wherein at least one of said plurality of apertures is aligned with at least one of said plurality of reflector structures.

2. The compound wafer structure of claim 1 wherein said plurality of light sources comprises a plurality of approximately 1.3 $\mu$m VCSEL light sources.

3. The compound wafer structure of claim 1 wherein said plurality of light sources comprises a plurality of VCSEL light sources emitting light with wavelengths approximately in the O-band.

4. The compound wafer structure of claim 1 wherein said plurality of detector structures comprises a plurality of detector structures detecting wavelengths approximately in the C-band.

5. The compound wafer structure of claim 1 wherein said plurality of detector structures comprises a plurality of approximately 1.3 $\mu$m wavelength detector structures.

6. The compound wafer structure of claim 1 wherein said plurality of detector structures comprises a plurality of approximately 1.5 $\mu$m wavelength detector structures.

7. The compound wafer structure of claim 1 wherein said plurality of detector structures comprises a plurality of approximately 1.3 $\mu$m wavelength detector structures and a plurality of approximately 1.55 $\mu$m wavelength detector structures.

8. The compound wafer structure of claim 1 wherein:
   at least one of said plurality of light sources is aligned with at least one of said plurality of reflector structures; and
   at least one of said plurality of detector structures is aligned with at least one of said plurality of reflector structures.

9. A compound wafer structure comprising:
   a substrate wafer, said substrate wafer comprising:
   a plurality of approximately 1.3 $\mu$m VCSEL light sources;
   a plurality of approximately 1.5 $\mu$m detector structures;
   a plurality of backside electrical connections formed in said substrate wafer; and
   at least one alignment structure formed in said substrate wafer;
   a coupling wafer bonded to said substrate wafer, said coupling wafer comprising:
   a plurality of apertures formed in said coupling wafer;
   a plurality of reflector structures formed in said coupling wafer; and
   at least one alignment structure formed in said coupling wafer;
   wherein at least a portion of said plurality of apertures are aligned with at least a portion of said plurality of reflector structures;
   wherein at least a portion of said plurality of light sources are aligned with at least a portion of said plurality of reflector structures; and
   wherein at least a portion of said plurality of detector structures are aligned with at least a portion of said plurality of reflector structures.

10. The compound wafer structure of claim 9 further comprising a plurality of approximately 1.3 $\mu$m wavelength detector structures formed in said substrate wafer.

11. The compound wafer structure of claim 9 further comprising an anti-reflective coating on said substrate wafer.

* * * * *